Patented June 19, 1951

2,557,083

UNITED STATES PATENT OFFICE 2,557,083

PLASTER BANDAGE AND METHOD AND COMPOSITION FOR MAKING SAME

James Joseph Eberl, Piscataway Township, Middlesex County, N. J., assignor to Johnson & Johnson, a corporation of New Jersey No Drawing. Application July 22, 1947
Serial No. 762,818

8 Claims. (Cl. 106—110)

This invention relates to a method for retarding the setting of plaster of Paris, and to plaster or Paris products including an improved set retarder or inhibitor therefor. This application is a continuation in part of application Serial No. 654,819, filed March 15, 1946, in the names of James J. Eberl and Alvin Richard Ingram, now abandoned.

Plaster of Paris which is a hemi-hydrate of calcium sulfate, is commonly prepared by heating gypsum to remove a portion of the water of crystallization therefrom. For many uses the plaster of Paris is mixed with water to form a paste, which after application to a surface or after formation to the desired shape is allowed to rehydrate and to dry whereby the plaster sets up as a hard mass. One of the early uses of this material was in the formation of casts to aid in the setting of broken bones.

More recently a plaster of Paris bandage that comprises particles of plaster of Paris adhering to a crinoline backing has been prepared for orthopedic use. The bandage is dipped in water for a brief period by the physician then wrapped around a portion of the body of the patient and allowed to set up as the cast. This plaster of Paris bandage is made by preparing a paste of plaster of Paris, spreading it upon a backing such as crinoline, and drying it without hydrating. It is necessary to inhibit setting up of the plaster while producing this bandage to prevent premature setting. The finished bandage product, however, should not be inhibited since a fast setting time is desirable when applying the plaster product to form a cast.

Inhibition of plaster setting during production of the bandage has been accomplished either by keeping the whole operation at a high temperature of the order of 95° C. or by adding a chemical inhibitor. Among such inhibitors were organic solvents of the water miscible type such as alcohol or acetic acid. These solvents would retard the setting of the plaster for a period of time sufficient to permit drying without setting during manufacture of the bandage and permit fast setting during preparation of the cast. These prior methods have certain inherent disadvantages. Acetic acid, for example, has to be used in large quantities and is therefore not only expensive, but obnoxious and difficult to dry. Alcohol requires use in even larger quantities at great cost and inconvenience.

Largely for non-orthopedic uses of plaster of Paris, permanent set retarders other than solvents are necessary and have been used to prevent the plaster from setting up while it is being worked. One or more of a number of salts including citrates, borax, succinates, alginates and proteinates have been applied to this purpose. These materials are ordinarily used in small proportions, say five per cent or less of the total composition. Nevertheless, they have a deleterious effect on the strength of the finished plaster. Moreover, they are not desirable for the manufacture of orthopedic bandages since they would lengthen the setting time of the finished product. For example, the setting time using these retarders might be ten or fifteen hours, whereas in application of an orthopedic bandage it is desirable to have a setting time of from about four to about eight minutes.

The object of this invention is to provide a process for the production of plaster of Paris products whereby the setting of the plaster is substantially retarded during preparation of a bandage or other product. It is a further object of the invention to provide a process for the production of finished plaster of Paris products that are substantially free of residual retarder.

Other objects of the invention are to provide a new and improved retarder for the setting of plaster of Paris and to provide an improved retarder, the retarding activity of which disappears readily from the plaster of Paris mix after preparation thereof.

Another object of the invention is to provide a process for the production of finished plaster of Paris products containing a transitory retarder having no retarding effect upon the setting of the finished plaster product. Provision of the products of the above processes forms a still further object of the invention.

These and other objects are accomplished by the present invention which is based upon the surprising discovery that ammonium or equivalent borates having a relatively low ratio of boron to nitrogen act as strong retarders for the setting of plaster of Paris, while those having a relatively high ratio have little or no retarding effect. During processing of the plaster, and particularly in the course of the drying step that follows application of the plaster of Paris to a fabric it is possible to decompose ammonium or equivalent borates having the low boron to nitrogen ratio, initially present in the plaster mix, with the formation of ammonium or equivalent borates having the high boron to nitrogen ratio. The finished plaster of Paris product will contain decomposition products of the original ammonium borate but will be substantially free of retarder.

In accordance with the invention compounds including borate and ammonium ions are introduced into a spreadable mix of plaster of Paris so as to provide a relatively low atomic ratio of boron to nitrogen, usually within the approximate range of between one-quarter and one of boron to one of nitrogen. This mix is spread upon a porous flexible backing such as crinoline and dried at a temperature sufficiently high to cause evaporation of most of the water and decomposition of the ammonium borate initially present. This decomposition proceeds until ammonium borates having a relatively high atomic ratio of boron to nitrogen, usually higher than three to one and often in the range of five to one, are formed.

The ammonium or equivalent borate may be added to the plaster mix as such but formation of the compound in situ is preferred. While use of ammonia and ammonium ion was found most satisfactory for many applications, equivalents of ammonia can be substituted to form equivalent borates. In connection with this invention substitution products of ammonia where short or lower molecular weight alkyl groups, preferably methyl or ethyl, replace one or more of the hydrogens, are considered equivalents of ammonia. In fact it is noted that fair results may be obtained using instead of ammonia a compound of the structural formula

where any or all of $R_1$, $R_2$ and $R_3$ are hydrogen or short alkyl groups instead of ammonia. Hydrogen, methyl and ethyl groups are of primary significance in this connection. The compounds substituted for ammonia are less suitable than ammonia itself because less volatile and often too basic.

The amount of ammonium borate or equivalent as defined above will vary somewhat depending on the type of plaster of Paris used, the amount of water, presence of accelerators, retarders or impurities, etc. In general from about 0.1 to about 2.0 parts by weight of ammonium borate [$(NH_4)_2HBO_3$] per one hundred parts of plaster of Paris is desirable. High amounts of the retarder in the range of 0.5–2.0 parts by weight are necessary with dry calcined plaster while lower amounts, preferably 0.1–0.7 part, are used with wet calcined plaster. Ordinarily, ammonia and boric acid are added separately and for this purpose from about 0.2 to about 2.0 parts of boric acid are used together with from about 0.1 to about 1.0 part of ammonia by weight for each one hundred parts of plaster used.

In a preferred method of executing the invention, which is here illustrated in connection with an orthopedic bandage, a spreadable mixture of plaster of Paris and water is prepared to which a small portion of ammonium borate has been added. The mix is then spread or coated on crinoline, gauze or any other suitable loose and porous support, and the coated support heated to drive off the water and excess ammonia. During the drying process, which is preferably carried out at elevated temperatures, the ammonium borate decomposes. The ammonia, being volatile, is driven off. The amount of boric acid and ammonia residually present in the bandage have little or no effect upon the setting time or characteristics of the bandage when it is wetted out and placed in use. For each plaster, however, there is a maximum amount of boric acid which can be tolerated without causing retardation by the residual ammonia.

Additional ingredients may be used. Preferably there is present in the spreadable mixture, an adhesive to aid in bonding the plaster particles to themselves and to the bandage. Certain types of plaster of Paris may require additional conventional accelerators, such as potassium sulfate, which accelerate the ultimate setting time during application by the physician. Sometimes it may be desirable to use other types of retarders in addition to the ammonium borate. Alternative methods of forming ammonium borate in situ are, for example, the use of combinations of calcium borate and ammonium sulfate, or borax and ammonium sulfate or ammonium bitetraborate and ammonia.

While the exact chemical theory involved is not thoroughly comprehended, it is believed that the retarding action is obtained by the presence of the borate ion.

The retarder must of course be removable so as to be absent from the finished bandage. Boric acid may remain after the ammonia is driven off. But whether or not this actually happens, it is at least established that boric acid as such is not an inhibitor. It seems probable on the basis of analyses, that upon the removal of ammonia, ammonium bitetraborate ($NH_4HB_4O_7$) or ammonium pentaborate ($NH_4B_5O_8$) remain which, while they may have some slight retarding effect, are not as strong in retarding action as the original ammonia or equivalent borate.

The following data illustrate the retarding action of the original ammonium borate on an orthopedic plaster having a pH of 8.6 and containing a small amount of borax. 66.7 parts of water per one hundred parts by weight of plaster were used in the test.

| Per Cent Ammonia [1] | Per Cent Boric Acid | Initial Set (Gilmore Needle) |
|---|---|---|
| | | Minutes |
| 0 | 0 | 6 |
| 0.04 | 0.1 | 7½ |
| 0.08 | 0.2 | 12 |
| 0.12 | 0.3 | 20 |
| 0.16 | 0.4 | 40 |
| 0.027 | 1 | 8 |
| 0.054 | 1 | 15 |
| 0.082 | 1 | 35 |

[1] Percentages are based on the weight of the plaster of Paris in the composition.

It will be seen from the above that about 0.3 per cent boric acid and about 0.1 per cent ammonia would be the desirable minimum amount, since even twenty minutes is not very long to allow for mixing, spreading, and batchwise drying of the plaster. For a continuous process, however, this may be sufficient. Extensive experimental work has demonstrated that for safely retarded mixes (retarded for over sixteen hours) at the pouring consistency of sixty-eight (U. S. Gypsum patty method for pouring consistency shown in U. S. Gypsum Company Bulletin I. G. L. No. 19) the boric acid should exceed 0.9 part and the ammonia 0.45 part per one hundred parts plaster.

In addition to the type of plaster, the water concentration also affects the amount of ammonium borate. For example, in varying water concentrations from fifty to one hundred parts per one hundred parts of plaster the setting time may vary from eighteen to four and one-half hours. The ammonium borate has been demonstrated to retard the setting time of plasters to which a setting accelerator has been added effectively. While the accelerator to some extent counteracts the effect of the ammonium borate, the prepared bandage retains the accelerator effect after the retarding effect of the ammonium borate is substantially removed.

In order to disclose the nature of the present invention more clearly and to show the manner in which it may be carried out, specific examples illustrating preferred embodiments of the invention are described hereinafter in considerable detail. It should be clearly understood that this is done, not for the purpose of limiting the breadth of the invention or restricting the scope of the appended claims, but only to illustrate the principles involved.

EXAMPLE I

| | Parts |
|---|---|
| Dry calcined plaster of Paris (consistency 65 to 78 c. c.) | 100 |
| Water | 70 |
| Boric acid | 0.65 |
| Ammonia | 0.33 |

In the preparation of the mix, boric acid was dissolved in the water and the ammonia slowly added under mild agitation. The plaster of Paris was added in a mixer and the material thoroughly mixed to the consistency of a heavy paste. The paste was applied to crinoline in the form of a thin film by means of a knife coater. The coated material was dried for about three minutes at a temperature of 310° F.

EXAMPLE II

| | Parts |
|---|---|
| Alpha-hemi-hydrate of calcium sulfate | 100 |
| Water | 70 |
| Boric acid | 0.35 |
| Ammonia | 0.175 |

The same mixing procedure was used as in Example I but the mix was of a thinner consistency and was coated with a roll coater.

The alpha-hemi-hydrate mentioned in Example II is a type of plaster of Paris sometimes called alpha-gypsum which comprises a regular crystalline structure of relatively heavy crystals. This crystalline structure is obtained by steam calcining or hot water slurry treatment with succinates, malates, or similar salts. Plasters of this type are described in U. S. Patent 1,901,051 and British Patent 563,019. These products are commercially available and are often used because of their high setting strength. They require less ammonium borate than ordinary calcined plasters.

The following examples are illustrative of the use of borates and ammonium compounds instead of borates and ammonia:

EXAMPLE III

| | Lbs. |
|---|---|
| Dry-calcined plaster | 100 |
| Borax | 1.5 |
| Ammonia | 0.5 |
| Ammonium sulfate | 0.5 |

EXAMPLE IV

| | Lbs. |
|---|---|
| Dry-calcined plaster | 100 |
| Precipitated calcium meta borate, $Ca(BO_2)_2 \cdot 2H_2O$ | 1.3 |
| Ammonia | 0.45 |
| Ammonium sulfate | 0.50 |

The necessary amounts of water should be added in both of the above examples.

A typical formula using a substituted ammonia follows:

EXAMPLE V

| | Lbs. |
|---|---|
| Dry calcined plaster | 100 |
| Boric acid | 0.9 |
| Trimethylamine | 0.75 |

Accelerator and water may be added depending upon the desired properties and the specific purpose of the mix.

If desired, suitable adhesives may be added to assist in retaining the plaster of Paris on its support until the bandage is used and to prevent plaster loss and telescoping as the bandage is wetted out and molded in service. The adhesives selected should be compatible with the ammonium borate. By way of example only, there is listed below a group of adhesives together with suggested amounts which may be used, based upon one hundred parts of plaster of Paris:

| | Parts |
|---|---|
| Dextrin | 2 to 4 |
| Tapioca starch | 1.5 to 3 |
| Methyl cellulose | 1.5 to 3 |
| Polyvinyl acetate emulsion | .55 to 1.5 |

It should be pointed out that if one contemplates a change in adhesive accelerator, or plaster, in the practice of this invention, one must check the effect of this additive on the retarding action of ammonium borate very carefully. In general, it may be said that alkaline materials increase the retarding action, while acidic materials and polyhydroxy compounds, for instance sugars, decrease it. Basic and acidic substances tend to increase or decrease the borate ion concentration in ammonium borate. Certain polyhydroxy compounds which increase the acidity of boric acid also tend to reduce the effectiveness of ammonium borate retarder drastically. How setting time was effected by added ingredients can be seen from the following mixes, one of which contains a 40% soluble sweet potato dextrin:

EXAMPLE VI

| | Parts |
|---|---|
| Steam calcined plaster of Paris | 100 |
| Ground gypsum | 0.5 |
| Ammonium sulfate | 0.2 |
| Vinyl acetate methyl methacrylate copolymer emulsion | 3.55 |
| Total water | 59 |

EXAMPLE VII

| | Parts |
|---|---|
| Industrial steam calcined plaster of Paris | 100 |
| Ground gypsum | 1.0 |
| Ammonium sulfate | 0.3 |
| Potassium sulfate | 0.2 |
| Sweet potato dextrin | 10.0 |
| Total water | 59. |

| Per Cent Boric Acid [1] in Water | Setting Time | |
|---|---|---|
| | Example VI | Example VII |
| | Hours | Hours |
| 0.6 | 1 | |
| 0.7 | 4 | |
| 0.8 | 8 | |
| 0.9 | 36 | 3/4 |
| 1.0 | | 2 |
| 1.1 | | 3 |
| 1.2 | | 6½ |
| 1.3 | | 15 |
| 1.4 | | 30 |

[1] 0.4 per cent ammonia added for every 1 per cent boric acid. The composition was prepared for spreading in a suitable mixer. To the water the required amount of ammonia and boric acid was first added.

Depending on the adhesive used, the water content must necessarily be varied. For example, the normal consistency of plaster may be increased considerably by one corn dextrin (six per cent water-soluble) or even lowered by another corn dextrin (one hundred per cent water-soluble). Therefore, a rather wide range of water content is presented for each type of coater. A knife coater demands a thick, heavy paste and a roll coater, a thin paste. At the boric acid concentrations given, the mix will not change appreciably in viscosity for at least three hours, provided there are no strong acids or acid salts, e. g., $(NH_4)_2SO_4$, in the accelerators or adhesives to repress the normal concentration of the borate ions. After this time, the mix will rapidly increase in viscosity and set up hard after an additional one-half to one hour.

The quantity of ammonium borate used in the preceding examples has been necessarily high in order to prevent premature setting during the coating of a large batch of plaster. However, if a continuous mixing process is used, it may be possible to use considerably smaller amounts of boric acid; this varies, since some adhesives raise the "consistency" or water demand of the mix.

In all cases of plaster preparation, it is essential that a mixing cycle be standardized since there is enough gypsum formation during mixing so that bandages always set faster than the original plaster, provided, of course, ammonia removal in the dryer has been efficient and the amount of boric acid is not excessive. The more violent the agitation, the more pronounced is this "seeding" or gypsum formation, and the faster setting are the bandages. Furthermore, the longer a batch is mixed, the faster is its setting time. For example, in a turbine mixer, a five minute mix might give a seven minute bandage, and a ten minute mix a six minute bandage, whereas the plaster would set in ten minutes in absence of violent agitation. Letting a mix stand without agitation has comparatively little effect on the setting time of bandages spread from this mix. The mix that these setting time experiments were made with did not show signs of setting within twenty hours.

In following the preferred method, the boric acid is added to the water in the mixer and the mixture stirred until the acid is thoroughly wetted. The ammonia follows, and the stirring continued until a clear solution results. At this time, the adhesive is added to the mix, if one is to be used. Such accelerators or retarders as may be desired to regulate the setting time of the plaster of Paris when the bandage is applied in use are also added at this point. Any adhesive added should be preferably in the form of a paste or emulsion, and the water that is present therein is used as part of the batch water comprising the mix. The plaster of Paris is then added and the mixtures stirred with sufficient rapidity to obtain a homogeneous slurry which is spread on the selected support. The coated support may be dried thereafter.

The drying process is carried out under conditions that will effect the hydrolysis of the ammonium borate to form ammonium pentaborate or ammonium bitetraborate, boric acid and ammonia, that permit the ammonia to escape, and that will not permit presetting of the plaster of Paris after the amount of ammonium borate present in the coated support has been reduced to the point where it is no longer effective as a set inhibitor. For the sake of economy, it is preferred that the product be dried as quickly as possible. The decomposition of the inhibitor may be represented by the following equations:

(1) $4NH_4BO_2 = NH_4HB_4O_7 + 3NH_3 + H_2O$ (2) $4(NH_4)_3BO_3 = NH_4HB_4O_7 + 11NH_3 + 5H_2O$ (3) $4(NH_4)_2HBO_3 = NH_4HB_4O_7 + 7NH_3 + 5H_2O$ (4) $NH_4HB_4O_7 + 5H_2O = 4H_3BO_3 + NH_3$

The amount of ammonia remaining in a bandage is dependent primarily on the concentration of boric acid and at least in experiments with a dry calcined plaster, it appeared to be independent of initial ammonia concentration, time of heating a dry bandage at 95° C., or initial water content. The relationship between residual ammonia content and boric acid concentration is shown below:

*Residual ammonia vs. boric acid concentration*

| Pts. Boric Acid per 100 pts. Dry Calcined Plaster | Pts. Ammonia per 100 pts. plaster before drying bandage 15 min. at 85° C. | Per Cent Ammonia Remaining in bandage. Analysis by direct titration with $H_2SO_4$ | | Setting Time of bandage |
|---|---|---|---|---|
| | | | | Minutes |
| 0.3 | 0.6 | .026 | .014 | 9 |
| 0.5 | 0.6 | .031 | .023 | 9 |
| 0.7 | 0.6 | .046 | .042 | 9½ |
| 0.9 | 0.6 | .046 | .049 | 9½ |
| 1.1 | 0.6 | .060 | .060 | 11 |

| Pts. Boric Acid per 100 pts. Steam Calcined Plaster | Pts. Ammonia per 100 pts. plaster before drying bandage 15 min. at 85° C. | Analysis by back-titration of Acidified Bandage | Setting Time of bandage |
|---|---|---|---|
| | | | Minutes |
| 0.2 | 0.285 | 0.017 | 7½ |
| 0.4 | 0.285 | 0.017 | 8½ |
| 0.6 | 0.285 | 0.025 | 15 |
| 0.8 | 0.285 | 0.037 | 20 |
| 1.0 | 0.285 | 0.037 | 27 |
| 1.2 | 0.285 | 0.054 | 33.5 |

While the drying procedure may be varied in many respects to secure the foregoing results, it is preferred that the drying conditions be so as to maintain the temperature in the coated article per se at 70–130° C. and preferably between 90 and 95° C. The maintenance of such temperature conditions accelerates the escape of the ammonia, which is less soluble in hot water than in cold water and insures a temperature sufficiently high to prevent presetting of the plaster, when the amount of ammonium borate present is reduced to ineffectiveness as a set retarder and prevents boiling of the water in the article and the detrimental results that would flow therefrom. The preferred temperature also prevents any tendency of the hemi-hydrate to be converted to anhydrite in the later stages of the drying process.

All embodiments within the scope of this specification and/or the appended claims are comprehended within the spirit and scope of this invention. These various embodiments of the invention were described for purposes of illustration rather than limitation. All variations and modifications of the invention are to be understood as included within the scope of the following patent claims.

What is claimed is as follows:

1. A settable plaster of Paris mix comprising a major portion of plaster of Paris and a minor portion, substantially 0.1–2% of an ammonium borate retarder for said mix having a relatively low ratio of boron to nitrogen substantially within the atomic range of between one-quarter and one of boron to one of nitrogen.

2. A settable plaster of Paris mix comprising a major portion of plaster of Paris and a minor portion, 0.1–two per cent based on the weight of said plaster of Paris, of an ammonium-borate having an atomic boron to nitrogen ratio of not more than substantially one to one.

3. A process for making a settable plaster of Paris product comprising in succession the steps: of incorporating in a plaster of Paris mix from about one-tenth of one per cent to about two per cent by weight of the plaster of Paris of an ammonium borate having a relatively low atomic ratio of boron to nitrogen, substantially within the atomic range of between one-quarter and one of boron to one of nitrogen, and water; forming the desired plaster of Paris product while said ammonium borate acts to retard the setting qualities of said plaster of Paris mix; and heating said mix at a temperature sufficient to decompose said ammonium borate and to cause evaporation of said water, whereby said ammonium borate is decomposed into an ammonium borate having a relatively high atomic ratio of boron to nitrogen corresponding to more than three to one.

4. A process for making a settable dry plaster of Paris product comprising in succession the steps: of providing a composition comprising a plaster of Paris mix, a total of from about one-tenth of one per cent to about two per cent by weight of said plaster of Paris of borate ion and of at least one nitrogen compound having the structural formula

where N is nitrogen and $R_1$, $R_2$, and $R_3$ are selected from the group consisting of hydrogen, methyl and ethyl groups, said composition having a low atomic ratio of nitrogen to boron substantially within the range of between one-quarter and one of boron to one of nitrogen, of forming the desired plaster of Paris product in presence of water while said nitrogen compound coacts with said borate to retard the setting time of said composition; and of heating said mix at a temperature sufficiently high to decompose said ammonium borate into an ammonium borate wherein the atomic ratio of boron to nitrogen corresponds to more than three to one, and to cause evaporation of said water.

5. In a process of making a dry settable plaster of Paris product the step of mixing with said plaster of Paris from about one-tenth of one per cent to about two per cent of its weight, of an ammonium borate having an atomic ratio of boron to nitrogen of substantially one or less to one.

6. A settable plaster of Paris mix comprising a major portion of steam calcined plaster of Paris, substantially alpha-hemihydrate of calcium sulfate, comprising from about one-tenth of one per cent to about 0.7 per cent based on the weight of said plaster of Paris of the chemical combination of borate ion and at least one nitrogen compound having the structural formula

where N is nitrogen and $R_1$, $R_2$, and $R_3$ are selected from the group consisting of hydrogen, methyl and ethyl groups, said borate nitrogen compound having an atomic ratio of boron to nitrogen of not more than one to one.

7. A settable dry plaster of Paris bandage comprising crinoline coated with a substantially unretarded settable dry plaster of Paris mix comprising in combination: one hundred parts by weight of plaster of Paris, and a minor amount, corresponding to about 0.2 to 2.0 parts of boric acid, of an ammonium borate having an atomic ratio of boron to nitrogen of more than about three to one.

8. A settable dry plaster of Paris bandage comprising crinoline coated with a substantially unretarded settable dry plaster of Paris mix comprising in combination: one hundred parts by weight of plaster of Paris, and a minor portion, corresponding to about 0.2 to 2.0 parts of boric acid, of the chemical combination of borate ion and at least one nitrogen compound having the structural formula

where N is nitrogen and $R_1$, $R_2$ and $R_3$ are selected from the group consisting of hydrogen, methyl and ethyl groups, said borate nitrogen compound having an atomic ratio of boron to nitrogen of more than about three to one.

JAMES JOSEPH EBERL.

REFERENCES CITED

The following references are of record in the file of this patent:

UNITED STATES PATENTS

| Number | Name | Date |
|---|---|---|
| 1,518,189 | Ellis | Dec. 9, 1924 |
| 1,953,898 | Reed | Apr. 3, 1934 |

FOREIGN PATENTS

| Number | Country | Date |
|---|---|---|
| 65,271 | Germany | 1892 |